US009823084B2

(12) United States Patent
Bauer

(10) Patent No.: US 9,823,084 B2
(45) Date of Patent: Nov. 21, 2017

(54) COORDINATING ARRIVAL AND DEPARTURE TIMES

(71) Applicant: Nicholaus J. Bauer, Joliet, IL (US)

(72) Inventor: Nicholaus J. Bauer, Joliet, IL (US)

(*) Notice: Subject to any disclaimer, the term of this patent is extended or adjusted under 35 U.S.C. 154(b) by 0 days.

(21) Appl. No.: 15/089,983

(22) Filed: Apr. 4, 2016

(65) Prior Publication Data

US 2016/0290816 A1 Oct. 6, 2016

Related U.S. Application Data

(60) Provisional application No. 62/143,060, filed on Apr. 4, 2015.

(51) Int. Cl.
*G01C 21/12* (2006.01)
*G08G 1/123* (2006.01)
*G01C 21/34* (2006.01)

(52) U.S. Cl.
CPC ................ *G01C 21/3438* (2013.01)

(58) Field of Classification Search
USPC .......................................... 701/465; 340/993
See application file for complete search history.

(56) References Cited

U.S. PATENT DOCUMENTS

| | | | | |
|---|---|---|---|---|
| 7,847,686 B1 * | 12/2010 | Atkins | ................. | G06Q 10/109 340/539.11 |
| 2002/0035592 A1 * | 3/2002 | Wu | ........................ | G06Q 10/10 709/202 |
| 2003/0167109 A1 * | 9/2003 | Clarke | ............... | G06Q 10/0631 701/3 |
| 2005/0143097 A1 * | 6/2005 | Wilson | .................. | H04W 64/00 455/456.3 |
| 2012/0223844 A1 * | 9/2012 | Giuli | ...................... | G08G 1/205 340/993 |
| 2012/0259669 A1 * | 10/2012 | Stilwell | ................ | G06Q 10/025 705/5 |
| 2016/0091330 A1 * | 3/2016 | Wicker | .............. | G01C 21/3415 701/410 |

OTHER PUBLICATIONS

GPS Rendez-Vous, "GPS Rendez-vous—Android Apps on Google Play", https://play.google.com/store/apps/details?id=com.gfprod.android.gps_rendezvous, last visited on Apr. 4, 2016, pp. 1-2.
Rendezvous Expert With GPS, "Rendezvous Expert with GPS—Android Apps on Google Play",https://play.google.com/store/apps/details?id=com.soniclabo.machiawase, last visited on Apr. 4, 2016, pp. 1-3.

* cited by examiner

*Primary Examiner* — Tyler Paige
(74) *Attorney, Agent, or Firm* — Fleit Gibbons Gutman Bongini Bianco PL; Thomas S. Grzesik

(57) ABSTRACT

Various embodiments coordinate travel among members of a group. In one embodiment, a destination that is common to each user in a plurality of users is identified. An arrival time for the plurality of users to arrive at the destination is determined. The arrival time is common to each user in the plurality of users. A current location of each user in the plurality of users is identified. A departure time is determined, for each user in the plurality of users, for the user to arrive at the destination by the arrival time based on at least the current location of the user. The departure time, for each user in the plurality of users, is transmitted to the user.

20 Claims, 9 Drawing Sheets

| Event ID 202 | Participant IDs 206 | Date 210 | Time 214 | Location 218 | Arrival Time 222 | ... |
|---|---|---|---|---|---|---|
| Event_1 204 | P1 208<br>P2<br>P3 | Date_A 212 | Time_A 216<br>To<br>Time_B | Location_A 220 | Ariv_A 224 | ... |
| ... | ... | ... | ... | ... | ... | ... |
| Event_N | P1<br>P2<br>P4<br>PN | Date_N | Time_C<br>To<br>Time_D | Location_N | Ariv_N | ... |

| Participant ID 302 | Events 306 | Communication Addresses 310 | Travel Data 314 | ... |
|---|---|---|---|---|
| P1 304 | Event_1 308 Event_N | Comm_1 312 Comm_2 | Travel_A 316 | ... |
| ... | ... | ... | ... | ... |
| PN | Event_N | Comm_N | Travel_N | ... |

FIG. 3

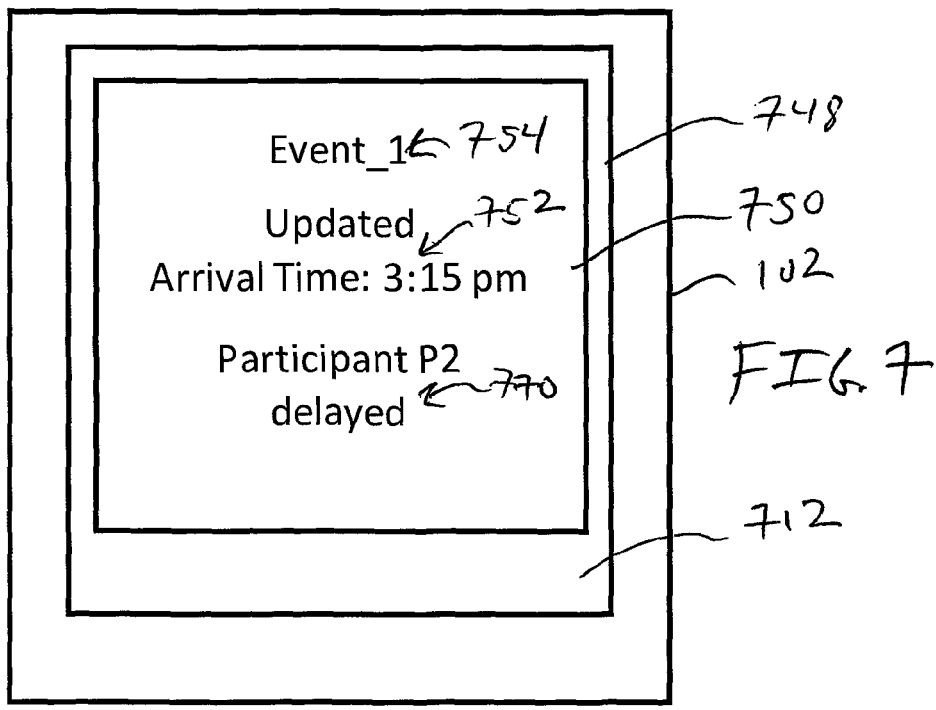
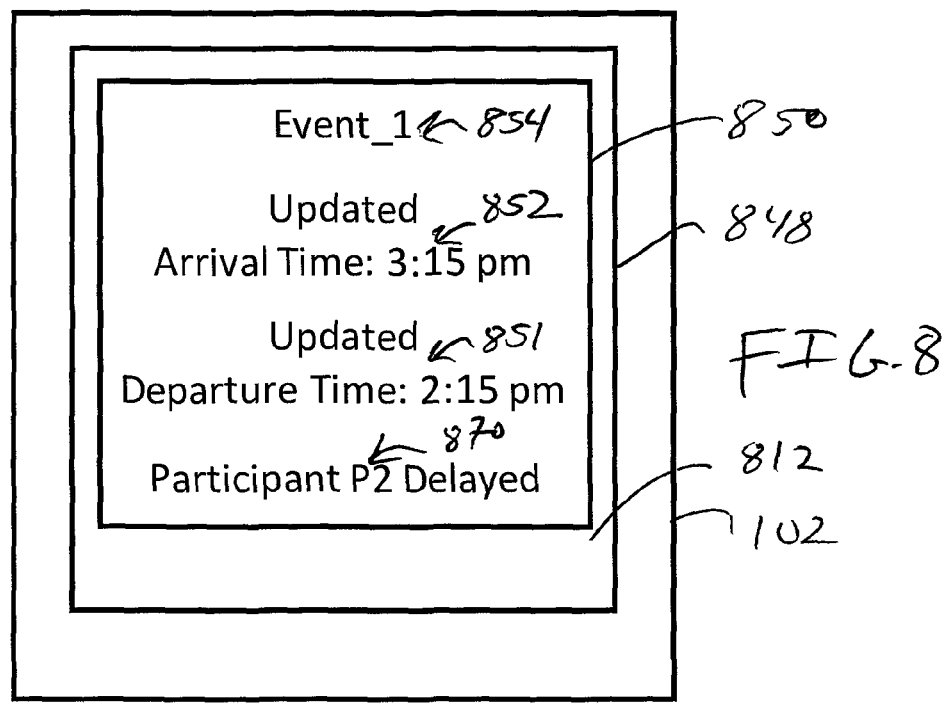

COORDINATING ARRIVAL AND DEPARTURE TIMES

BACKGROUND

The present disclosure generally relates to a system and method for coordinating arrival and departure time, and more particularly relates to a system and a machine-implemented method of calculating and notifying individuals of departure times in order to arrive at a meeting at a desired time.

People meet in groups to collaborate on ideas and for social gatherings. However, it is often difficult to coordinate arrival and departure times for each individual who attends a meeting due to numerous factors, such as travel time and distance. As a result, individuals arrive to a meeting at different times, and those who arrive early spend time waiting for the arrival of the entire party or group. To coordinate arrival times, individuals generally communicate with each other via text messages, emails, or phone calls to notify one another of his or her whereabouts.

BRIEF SUMMARY

In one embodiment, a system comprises a plurality of electronic devices such as mobile phones, PDAs, and tablet computers, wherein the devices are connected to each other via a network. Additionally, it is contemplated that the devices comprises a GPS transceiver so that they are connected to one or more GPS satellites. In this way, the system determines the real-time location of the devices, thereby locating the individuals having the devices on their person. Each device comprises a software program or an application installed thereon, wherein the program is accessible via a user interface on the device.

The program allows an individual to set up a meeting by specifying a meeting time, date, and location. The individual can then invite one or more third parties to the meeting. Alternatively, the program can automatically set up a meeting and invite attendees based on discussions via email or text messages. Once an individual is invited to a meeting, the individual can accept and join to receive information or notifications regarding the meeting via his or her electronic device.

The software program is further configured to utilize at least one mapping and routing servers. Without limitation, the present invention may utilize existing mapping and routing servers such as Google Maps, MapQuest, Open Street Maps, and the like. It is contemplated that the mapping and routing servers utilize crowd data, road sensors, and predictive analysis, as well as a real-time location of an individual, a destination, and the individual's movement to calculate an estimated travel time. Based on the travel time and a desired arrival time, the software program calculates a recommended departure time for the individual.

While the recommended departure time is specific to each individual attending the meeting, the arrival time remains the same for the entire group. In this way, the system and method allows the entire group to arrive at the meeting at the coordinated time. When an individual departs to attend the meeting, the entire group receives the notification that the individual is en-route. If the individual encounters a delay due to traffic, weather, or traffic, among other factors, the group is automatically notified of the delay and the new estimated arrival time. It is contemplated that text messages, emails, push notifications, or pre-recorded phone calls may be used for notifications.

In another embodiment, a method for coordinating travel among members of a group is disclosed. The method comprises determining a destination that is common to each user in a plurality of users. An arrival time for the plurality of users to arrive at the destination is determined. The arrival time is common to each user in the plurality of users. A current location of each user in the plurality of users is identified. A departure time is determined, for each user in the plurality of users, for the user to arrive at the destination by the arrival time based on at least the current location of the user. The departure time, for each user in the plurality of users, is transmitted to the user.

In yet another embodiment, a non-transitory computer program product for coordinating travel among members of a group is disclosed. The non-transitory computer program product comprises a computer readable storage medium having computer readable program code embodied therewith, the computer readable program code configured to perform a method. The method comprises determining a destination that is common to each user in a plurality of users. An arrival time for the plurality of users to arrive at the destination is determined. The arrival time is common to each user in the plurality of users. A current location of each user in the plurality of users is identified. A departure time is determined, for each user in the plurality of users, for the user to arrive at the destination by the arrival time based on at least the current location of the user. The departure time, for each user in the plurality of users, is transmitted to the user.

In a further embodiment, an information processing system for coordinating travel among members of a group is disclosed. The information processing system comprises memory and at least one information processing system communicatively coupled to the memory. The information processing system also comprises a travel coordinator that is communicatively coupled to the memory and the at least one processor. The travel coordinator is configured to perform a method. The method comprises determining a destination that is common to each user in a plurality of users. An arrival time for the plurality of users to arrive at the destination is determined. The arrival time is common to each user in the plurality of users. A current location of each user in the plurality of users is identified. A departure time is determined, for each user in the plurality of users, for the user to arrive at the destination by the arrival time based on at least the current location of the user. The departure time, for each user in the plurality of users, is transmitted to the user.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 2 shows one example of event data according to one embodiment of the present disclosure;

FIG. 3 shows one example of event participant data according to one embodiment of the present disclosure;

FIG. 7 shows one example of a user interface presenting an updated arrival time to a user according to one embodiment of the present disclosure;

FIG. 8 shows one example of a user interface presenting an updated departure time to a user according to one embodiment of the present disclosure;

DETAILED DESCRIPTION

Operating Environment

Figure 1:
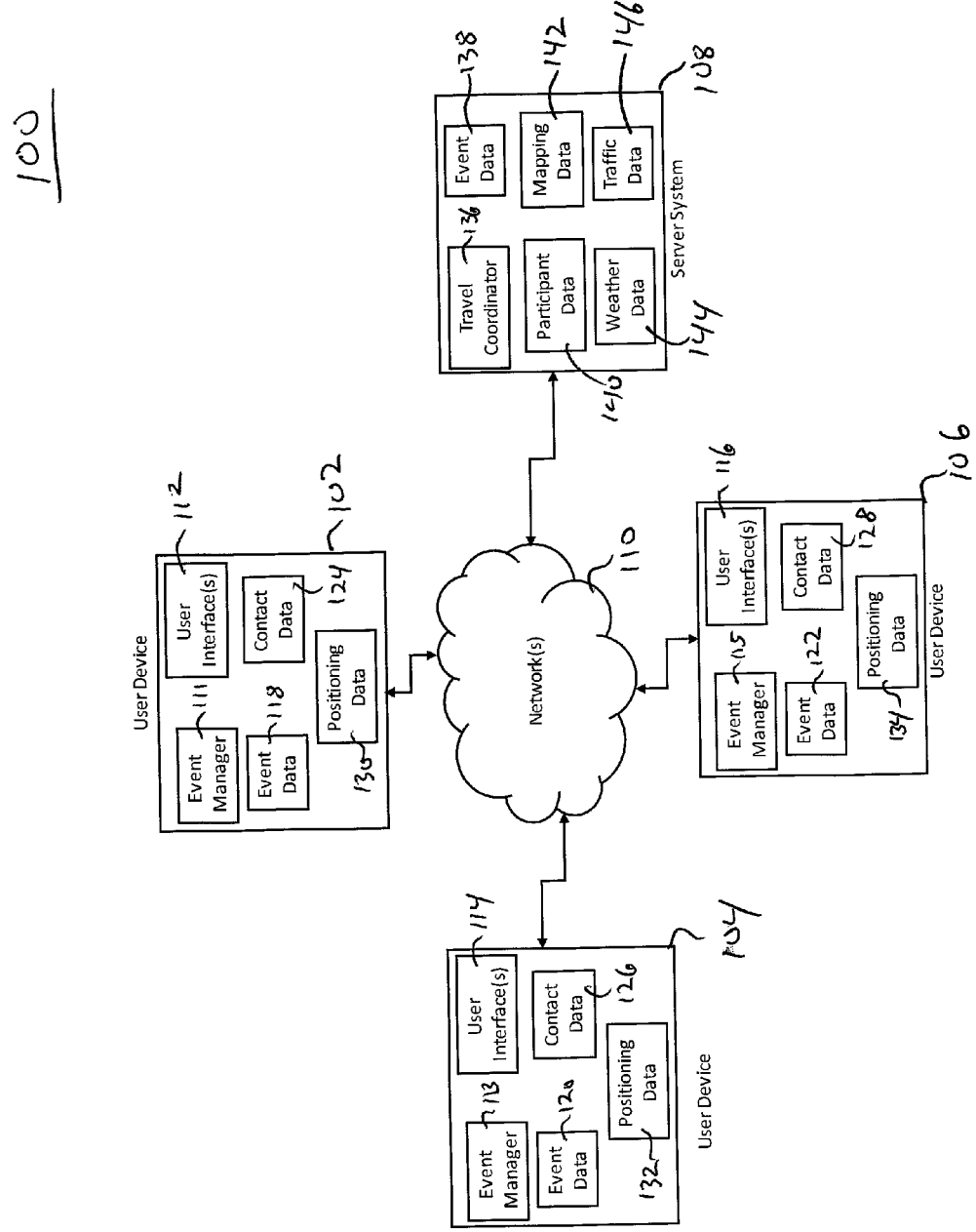
FIG. 1 shows one example of an operating environment according to one embodiment of the present disclosure.

FIG. 1 shows an operating environment 100 according to one embodiment of the present disclosure. The operating environment 100 comprises a plurality of user devices 102, 104, 106 and one or more server systems 108 that are communicatively coupled to at least one network 110. In one embodiment, the user devices 102, 104, 106 are portable electronic devices electronic device is an electronic device such as a wireless device capable of sending and receiving wireless signals. Examples of wireless devices include (but are not limited to) cellular telephones, mobile phones, smart phones, two-way pagers, wireless messaging devices, wearable computing devices, desktop computers, laptop computers, tablet computers, personal digital assistants, a combination of these devices, and/or other similar devices.

The network(s) 110, in one embodiment, comprises cloud and/or non-cloud based technologies, a local area network (LAN), a general wide area network (WAN), public networks such as the Internet, private networks wireless communication networks, non-cellular networks such as Wireless Fidelity (Wi-Fi) networks, and/or the like. The wireless communication networks support any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication networks include one or more networks based on such standards. For example, in one embodiment, a wireless communication network comprises one or more of a Long Term Evolution (LTE) network, LTE Advanced (LTE-A) network, an Evolution Data Only (EV-DO) network, a General Packet Radio Service (GPRS) network, a Universal Mobile Telecommunications System (UMTS) network, and the like.

In one embodiment, each of the user devices 102, 104, 106 comprises at least an event manager 111, 113, 115; user interface(s) 112, 114, 116; event data 118, 120, 122; contact data 124, 126, 128; and positioning data 130, 132, 134. The event manager, in one embodiment, manages event data, notifies users of upcoming events, manages invitations to and from other participants of an event, and/or the like.

The user interface(s), in one embodiment, is a program such as a navigation program, webpage, mashup, graphical user interface (GUI), a command line, etc. In one embodiment, the user interface presents mapping and navigation information to the user of the device. The mapping and navigation information can be generated locally by the device and/or remotely via the server 108 or any other remote information processing system(s). The user interface(s) also presents notifications on a display of the device. Examples of notifications include expected arrival time to a given destination, suggested departure time, notification that an event participant has departed for the event destination, notification that an event participant has arrived at the event destination updated arrival time, updated departure time, and/or the like.

The event data includes information such as calendar data identifying a date(s), start time, end time, participant information, and location information associated with a specific event. Contact data includes information such as names, addresses, contact information (phone numbers, email addresses, social network identifiers, messaging address, etc.), and/or the like for specific individuals known to the user of the device. The positioning data comprises, for example, global positioning system coordinates, velocity data, altitude data, and/or the like associated with the device and (optionally) other devices associated with participants of an event(s). It should be noted that one or more of the event data, contact data, and positioning data can be stored on a remote/external information processing system such as the server 108.

The server 108, in one embodiment, comprises a travel coordinator 136, event data 138, participant data 140, mapping data 142, weather data 144, and traffic data 146. The travel coordinator 136, in one embodiment, coordinates departure and arrival times for a plurality of event participants utilizing various inputs such as the event data 138, device data 140, mapping data 142, weather data 144, and traffic data 146. As will be discussed in greater detail below, the travel coordinator 136 notifies each event participant of a suggested time to arrive at the event location. The travel coordinator 136 also notifies each event participant of a suggested time to depart the participant's current location to arrive at the event location by the suggest arrival time. In some embodiments, the departure time provided to participant(s) is dependent upon travel data associated with the participant and at least one other participant associated with the event. For example, the departure time provided to Participant A is dependent upon Participant A's current location with respect to the event location; Participant B's current location with respect to the event location; Participant C's current location with respect to the event location, traffic and weather delays expected to be encountered by Participants A, B, and C; and/or the like.

The event data 138 comprises a unique identifier (ID) associated with particular event, identifiers associated with participants of the event, event location, event time/data information, and/or the like. The event data can be obtained from one or more of the event participants, remote servers maintaining the event data; and/or be maintained locally by the server 108. The participant data 142 comprises a unique ID associated with each user being coordinated by the travel coordinator 136; a unique ID of an event(s) associated with the participant; a communication address(es) associated with a participant such as phone number, email address, social network address, messaging address, etc.; current travel data such as location (e.g., latitude/longitude coordinates), altitude, velocity, distance to a specific location, departure time, arrival time, etc.; and/or the like. The mapping data 142 comprises routes and maps (e.g., navigational data) that the travel coordinator 136 utilizes when suggesting one or more routes to a participant and calculating departure and arrival times. The mapping data 142 can be maintained locally be the server 108 and/or obtained from one or more remote servers. The weather data 144 comprises, for example, current weather conditions and forecasts for current locations of participants and locations expected to be traveled through by participants. The weather data 144 can be maintained locally be the server 108 and/or obtained from one or more remote servers. The traffic data 146 comprises, for example, current traffic conditions and forecasts for current locations of participants and locations expected to be traveled through by participants. The traffic data 146 can be maintained locally be the server 108 and/or obtained from one or more remote servers. It should be noted that at least one of the travel coordinator 136, event data 138, participant data 140, mapping data 142, weather data 144, and traffic data 146 can reside on a user device as well.

Coordinating Travel and Departure Times

As noted above, one or more embodiments coordinate arrival and departure times for each participant in a group. In one embodiment, at least one user of a user device 102 schedules an event with at least one other user. For example, the user creates event data 124 by entering information in the user via a user interface 112 such as a name for the event, a time(s)/date(s) for the event, a location (e.g., location name, address, etc.) of the event, participants of the event (name, communication addresses/numbers, etc.), and/or the like). The event data 124 is stored in a calendar, database, etc. on the user device 102 and/or a remote server such as server 108. In one embodiment, once an event is created the event manager 111 sends an invitation to each of the event participants via the communication address(es) identified by the user in the event data. The event manager of the user devices associated with these participants receives the invitation and displays the invitation to the user via the user interface. Alternatively, the invitation can be displayed within an email client, messaging client, and/or the like. The participants provide an input either accepting or denying the invitation and a response is sent to the event creator. The event manager can also be configured to automatically accept or deny event invitation in a blind manner or based on some criteria such as event creator, event time/date, event location, event description, event participants, etc.

The event manager 111 of the event creator device 102 then notifies the event creator whether a specific invited participant has accepted or denied the invitation. The event data 124 for the specific event is then updated accordingly. If an invited participated does not respond within a threshold period of time the invited participant can be listed as tentative or removed as a participant. In addition, the event manager 111 can continue to send out new invitations to the invited participant until a response is received.

In another embodiment, the event manager 111 monitors a user's emails, messages, social networking sites to identify planned events and participants. For example, the event manager 111 analyzes text messages received from one or more users. Based on this analysis, the event manager 111 determines that User 1 (the user of device 102), User 2, and User N will be meeting each other on Date_A, at Time_B, at Location_C. The event manager 111 creates event data 124 for the identified event similar to that discussed above. If participant communication addresses (e.g., phone number, email address, messaging address, etc.) cannot be identified from the analyzed media, then the contact data 124 associated with the user can be analyzed to identify contact entries associated with the participants. If the participants of the event are not associated with an entry in the user's contact data 124, the event manager 111 can prompt the user to provide the required information. It should be noted that, in one embodiment, the travel coordinator 136 at the server 108 can be configured to perform the operations discussed above with respect to the event managers.

Once a device 102, 104, 106 creates event data associated with an event, the device sends a copy of the event data to the server 108. The travel coordinator 136 stores the received data as part of its event data 138. The travel coordinator 136 also extracts participant information from the event data and stores this information as part of its participant data 140. FIG. 2 shows one example of event data 138 maintained by the server 108. In this example, FIG. 2 shows a table 200 where each row corresponds to a single event. However, other mechanisms for organizing event data are applicable as well. A first column 202 entitled "Event ID" comprises entries 204 uniquely identifying an event associated with the row. A second column 206 entitled "Participant IDs" comprises entries 208 with the participant identifiers for all participants of the event. The participant identifiers can correspond to a participant record in the participant data 140, the participant name, the participant communication address, and/or the like. A third column 210 entitled "Date" comprises entries 212 identifying the date(s) of the associated event. A fourth column 214 entitled "Time" comprises entries 216 identifying the start/stop and/or any other time information associated with the event. A fifth column 218 entitled "Location" comprises entries identifying the location of the event such as street address, longitude/latitude coordinates, venue name, intersection, etc. A sixth column 222 entitled "Arrival Time" comprises entries 224 identifying a calculated time at which all of the participants should arrive at the event location. In another embodiment, the entries 224 comprise a given number of seconds, minutes, hours, days, etc. that the participants should arrive at the event location. In some embodiments, different arrival times can be stored for different participants of an event.

FIG. 3 shows one example of participant data 140 maintained by the server 108. In this example, FIG. 3 shows a table 300 where each row corresponds to a single participant. However, other mechanisms for organizing participant data are applicable as well. A first column 302 entitled "Participant ID" comprises entries 304 uniquely identifying a participant associated with the row. The participant ID entries can also comprise the participant name, the participant communication address, and/or the like. A second column 306 entitled "Events" comprises entries 308 with the event identifiers for all events associated with the participant. In one embodiment, the event identifiers under this column correspond to the event identifiers within the event data 138. A third column 310 entitled "Communication Addresses" comprises entries 312 identifying the communication address(es) associated with the participant such as phone number, email address, social network address, messaging address, etc. A fourth column 314 entitled "Travel Data" comprises entries 316 identifying various travel data associated with the participant and its device 102 such as such as location (e.g., latitude/longitude coordinates), altitude, velocity, distance to a specific location, departure time, arrival time, etc.; and/or the like. Travel data can be obtained by the travel coordinator 136 directly from the user device 102, 104, 106; obtained from another server; calculated by the travel coordinator; obtained from one or more global positioning systems; and/or the like In one embodiment, the travel coordinator 136 its event data 138 and determines, that an event is to start within a given threshold of time based on the time data associated with the event. The travel coordinator 136 then initiates coordination operations for the event. In another embodiment, the event manager 111 at a user device determines that a user begun to travel to the event location based on navigational information such as a destination address entered into the user interface 112. The event manager 111 then notifies the travel coordinator 136 by sending a notification comprising at least the event identifier associated with the event. Alternatively, the user device 102 can transmit navigational data to the travel coordinator 136, which then determines the user has started to travel to the event location. The travel coordinator 136 then initiates coordination operations for the event. In a further embodiment, a participant is able to select an option presented via the user interface 112, which instructs the travel coordinator 136 to begin coordination operations for a specific event.

The travel coordinator 136 identifies the participants associated with the event based on the event data 138 and/or the participant data 140. For example, if the travel coordinator 136 is performing coordination operations for Event_1 the travel coordinator 136 determines that user P1, user P2, and user P3 are participants of Event_1. The travel coordinator 136 calculates or determines an initial arrival time for the participants to arrive at the event location. The initial arrival time can be the start time of the event as indicated in the event data 138, a given amount of time before/after the start time of the event, and/or the like.

In another embodiment, travel coordinator 136 identifies the current location of each participant of the event. For example, the travel coordinator 136 identifies the current location of participants P1, P2, and P3 for Event_1. The travel coordinator 136 identifies the current location of the participants based on location information (e.g., latitude/longitude) obtained from the devices 102, 104, 106 associated with the participants and/or one or more remote servers. For example, the travel coordinator 136 can query the devices 102, 104, 106 to send their current location to the coordinator 136. The devices 102, 104, 106 can also provide their location data to the travel coordinator 136 at predefined intervals. The travel coordinator 136 analyzes the received location data and identifies the device that is furthest from the event location. The coordinator 136 calculates the arrival time for the event based on this device.

For example, the travel coordinator 136 identifies at least one route for that the device can travel to arrive at the event location utilizing the mapping data 142 (and optionally the weather data 144 and traffic data 146). Alternatively, the user of the device can select a route via the user interface and notify the travel coordinator 136 of the selected route. The travel coordinator 136 calculates the amount of time it will take the device to travel to the event location based on the identified route(s). If multiple routes are identified, the travel coordinator 136 can calculate the amount of time associated with the best route (fastest, shortest, fastest and shortest, etc.); calculate the amount of time associated with the worst route (slowest, longest, slowest and longest, etc.); and/or can average the amount of time calculated for all (or subset of) the identified routes.

Figure 4:
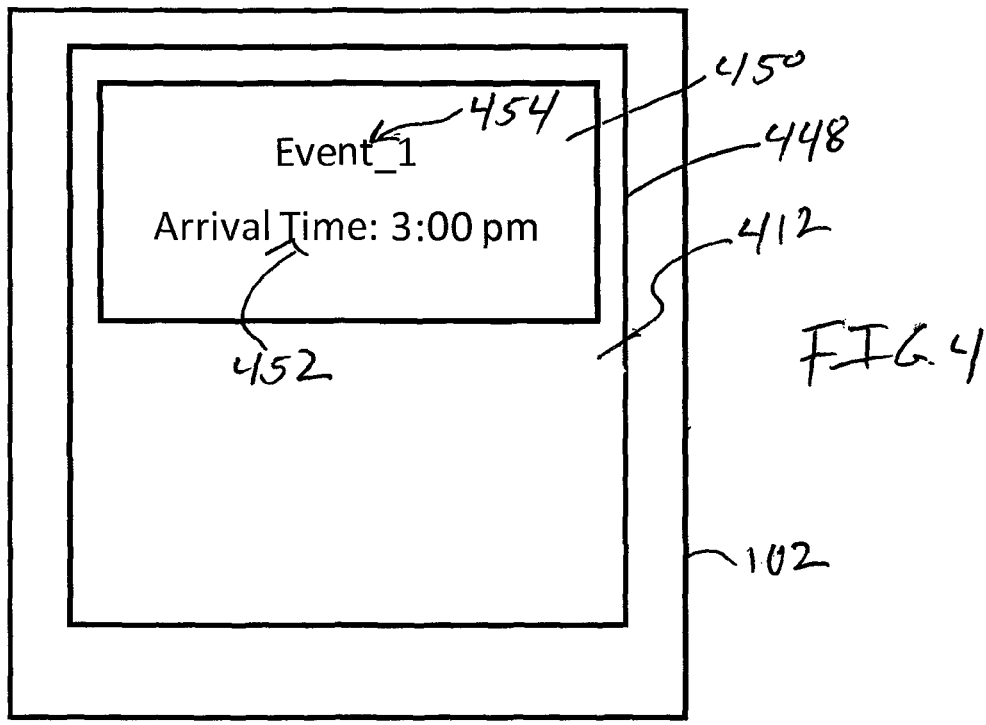
FIG. 4 shows one example of a user interface presenting a common arrival time to a user according to one embodiment of the present disclosure.

The travel coordinator 136 then notifies each participant of the arrival time for the event. In one embodiment, the same arrival time is sent to each participant of the event. However, in other embodiments, two or more participants can receive different arrival times. The event manager 111, 113, 115 at each participant device 102, 104, 106 presents the arrival time to the user via the user interface 112, 114, 116. For example, FIG. 4 shows a user interface 412 being presented on a display 448 of a user device 102. In this example, the user interface 412 presents a notification 450 to the user displaying a suggested arrival time 452 for the identified event 454. The notification can be a push notification, an email message, text or multimedia message, social networking message, and/or the like. In one embodiment, the arrival time is presented to the user in a navigational program.

In addition to an arrival time, a departure time is calculated by the travel coordinator 136 for each event participant. In one embodiment, the travel coordinator 136 identifies the current location of each participant of the event. For example, the travel coordinator 136 identifies the current location of participants P1, P2, and P3 for Event_1. The travel coordinator 136 identifies the current location of the participants based on location information (e.g., latitude/longitude) obtained from the devices 102, 104, 106 associated with the participants and/or one or more remote servers. For example, the travel coordinator 136 can query the devices 102, 104, 106 to send their current location to the coordinator 136. The devices 102, 104, 106 can also provide their location data to the travel coordinator 136 at predefined intervals. A participant can also notify the travel coordinator 136 of a future location at which the participant will be at. The travel coordinator 136 can use this location for its departure time calculations.

The coordinator 136 then calculates a time, for each participant, at which the event participant should leave his/her current location to arrive at the event location by the arrival time previously calculated/determined by the travel coordinator 136. In one embodiment, travel coordinator 136 identifies at least one route that participant can travel from its current location to arrive at the event location utilizing the mapping data 142 (and optionally the weather data 144 and traffic data 146). The travel coordinator 136 calculates the departure time based on the calculated arrival time for the event and one or more of the distance needed to travel on this route to the event location; the speed limits for the various segments of the route; the average speed of travel for the road segments of the route; current traffic conditions; historic traffic conditions; current weather conditions; forecasted weather conditions; and/or the like.

In another embodiment, the travel coordinator 136 calculates a departure time for a plurality of different routes such as the fastest (shortest travel time) route, the shortest distance route, the slowest (longest travel time) route, the longest (longest distance); and/or the like. The travel coordinator 136 can also calculate a departure time based on an average of all departure times calculated for the plurality of routes. In a further embodiment, the participant can select a route via the user interface 112 and notify the travel coordinator 136 of the selected route. In this embodiment, the user selects a route from a list of routes provided by a navigational program or selects from one of the plurality of routes identified by the travel coordinator 136. The travel coordinator 136 then calculates the departure time based on the selected route. The departure times are calculated so that all of the participants can arrive at the event location at the same time (i.e., the calculated arrival time).

Figure 5:
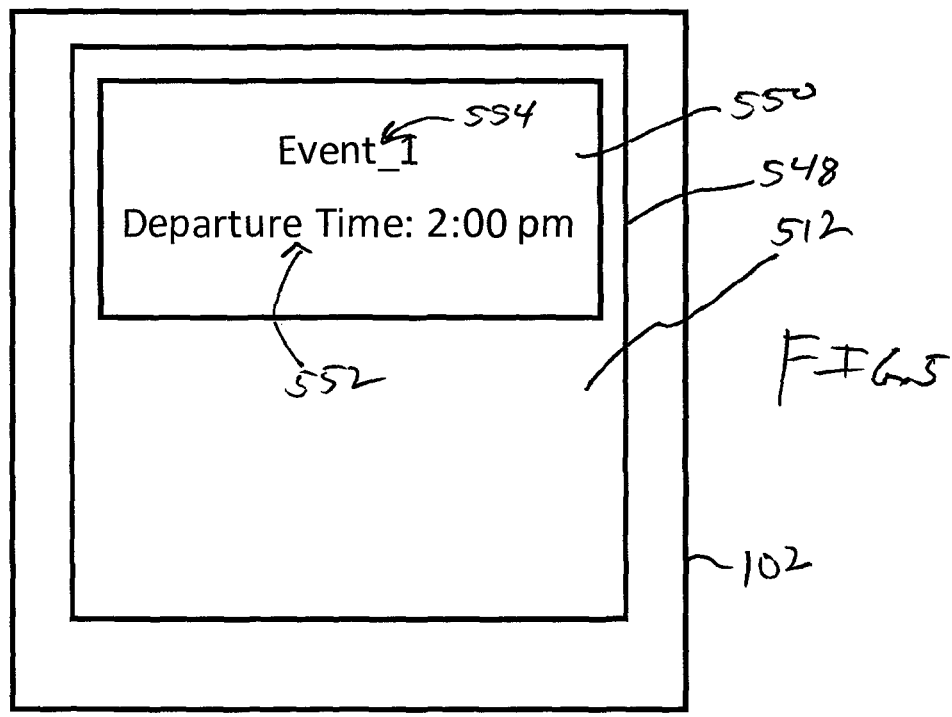
FIG. 5 shows one example of a user interface presenting a suggested departure time to a user according to one embodiment of the present disclosure.

Once a departure time is calculated for a participant, the travel coordinator 136 sends a notification to the participant's device 102, 104, 106. For example, FIG. 5 shows a user interface 512 being presented on a display 548 of a user device 102. In this example, the user interface 512 presents a notification 550 to the user displaying a suggested departure time 552 for the identified event 554. The notification comprising the departure time (or the arrival time) can be sent upon request from a participant, a given threshold of time prior to the calculated departure or arrival time, at the calculated departure time, and/or the like. In some embodiments, separate notifications for the arrival time and the departure time are not required, and a single notification comprising both the arrival and departure times can be sent by the travel coordinator and/or displayed by the device 102, 104, 106. Also, the travel coordinator 136 can monitor weather and/or traffic conditions to determine if a departure time should be updated for one or more of the participants. If weather/traffic conditions worsen or improve the travel coordinator 136 can send the affected participants updated departure times and/or routes.

Figure 6:
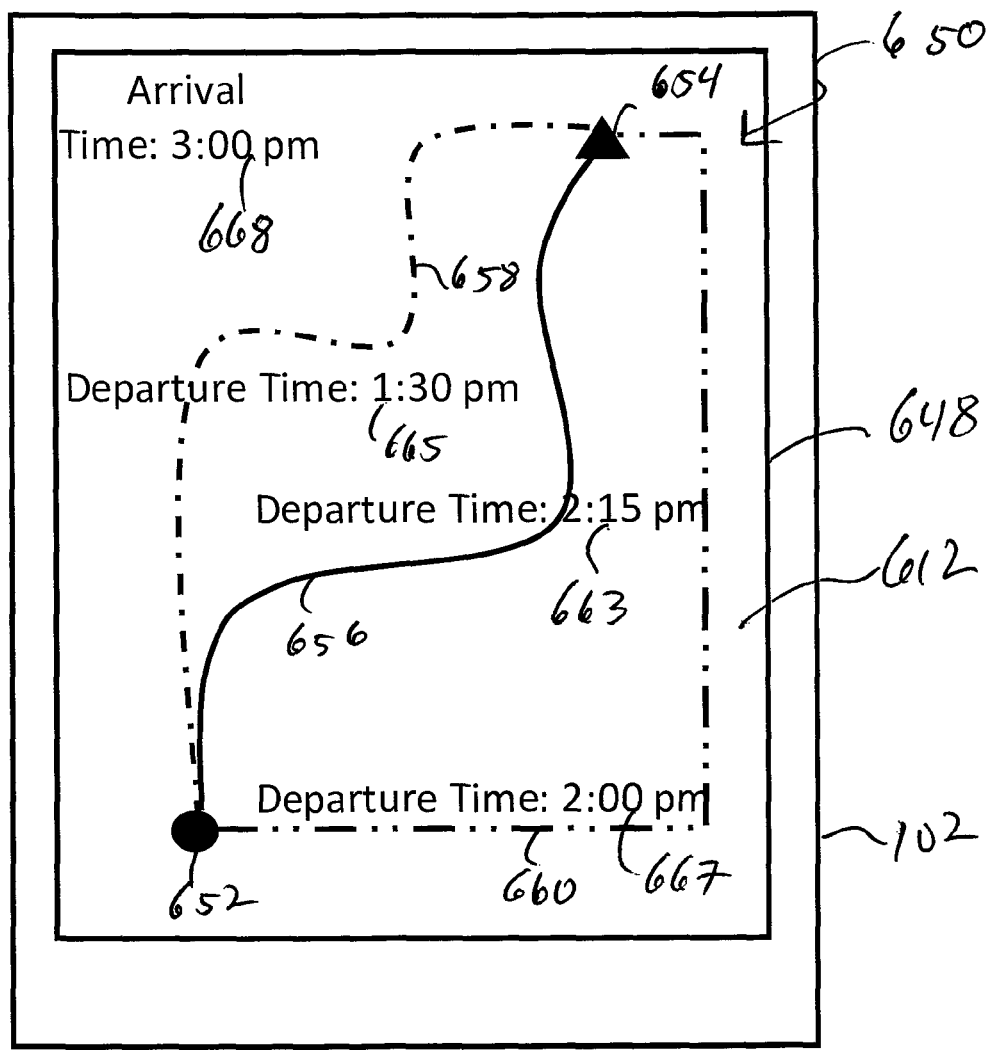
FIG. 6 shows one example of a user interface presenting a plurality of routes and their associated departure times according to one embodiment of the present disclosure.

In another embodiment, the travel coordinator 136 sends the user device 102, 104, 106 a list of routes along with their calculated departure times. The routes and their departure times are then presented to the participant via the user interface 112 114, 116 of the device 102, 104, 106. The user is able to select one of the routes as input to a navigation program. For example, FIG. 6 shows a user interface 612 being presented on a display 648 of a user device 102. In this example, the user interface 612 presents a map 650 comprising displaying the participant's current location 652 and the event location 654. The map 650 also presents a plurality of routes 656, 658, 660 received from the travel coordinator 136 along with their suggested departure times 663, 665, 667 for arriving at the location by the suggested arrival time 668.

As the participants being travelling to the event location, the travel coordinator 136 monitors the travel progress of the participants. The travel coordinator 136 obtains travel data (stored within the participant data 140) for each participant by, for example, receiving periodic updates from the user devices 102, 104, 106; querying the user devices 102, 104, 106; querying one or more remote servers; and/or the like. If the travel coordinator 136 determines, based on the monitoring, that a participant has not begun travelling to the event location by the suggested departure time calculated for the participant the travel coordinator 136 can send one or more reminder notifications to the participant's device 102, 104, 106. The user interface 112 of the participant's device 102 then displays the reminder notification to the participant.

The travel coordinator 136 also utilizes the travel data associated with each participant to determine if a participant will arrive at the event location after the suggested arrival time. For example, a participant may have left after his/her suggested departure time, not have started traveling to the event location, may have encountered traffic or hindering weather conditions, and/or the like. In this embodiment, the travel coordinator 136 can calculate an expected arrival time for the delayed participant based on the travel data including weather data and traffic data associated therewith. The travel coordinator 136 then updates the suggested arrival time for the participants based on the expected arrival time of the delayed participant(s). If more than one participant is delayed, the travel coordinator 136 updates the arrival time based on an average of the expected arrival times of the delayed participants, or based on the latest expected arrival time. In some embodiments, the travel coordinator 136 only updates the suggested arrival time if the expected arrival times of the delayed participants are greater than a given time threshold with respect to the original suggested arrival time.

The travel coordinator 136 then sends a notification/message to each of the participant devices 102, 104, 106 with an updated suggested arrival time. For example, FIG. 7 shows a user interface 712 being presented on a display 748 of a user device 102. In this example, the user interface 712 presents a notification 750 to the user displaying an updated suggested arrival time 752 for the identified event 754 and an optional notification 770 identifying which of the participants is delayed. This allows the participants to adjust their travel accordingly so that all participants can arrive at the event location at approximately the same time.

In another embodiment, the travel coordinator 136 identifies if any of the participants have not started travelling to the event location. If so, the travel coordinator 136 calculates a new departure time for these participants according to the updated arrival time. The new departure time is calculated similar to the original departure time discussed above. The travel coordinator 136 sends a notification/message to the devices 102, 104, 106 of the participants with the updated departure time information. For example, FIG. 8 shows a user interface 812 being presented on a display 848 of a user device 102. In this example, the user interface 812 presents a notification 850 to the user displaying an updated suggested departure time 851 for the identified event 854, an updated arrival time 852, and an optional notification 870 identifying which of the participants is delayed.

Operational Flow Diagram

Figure 9:
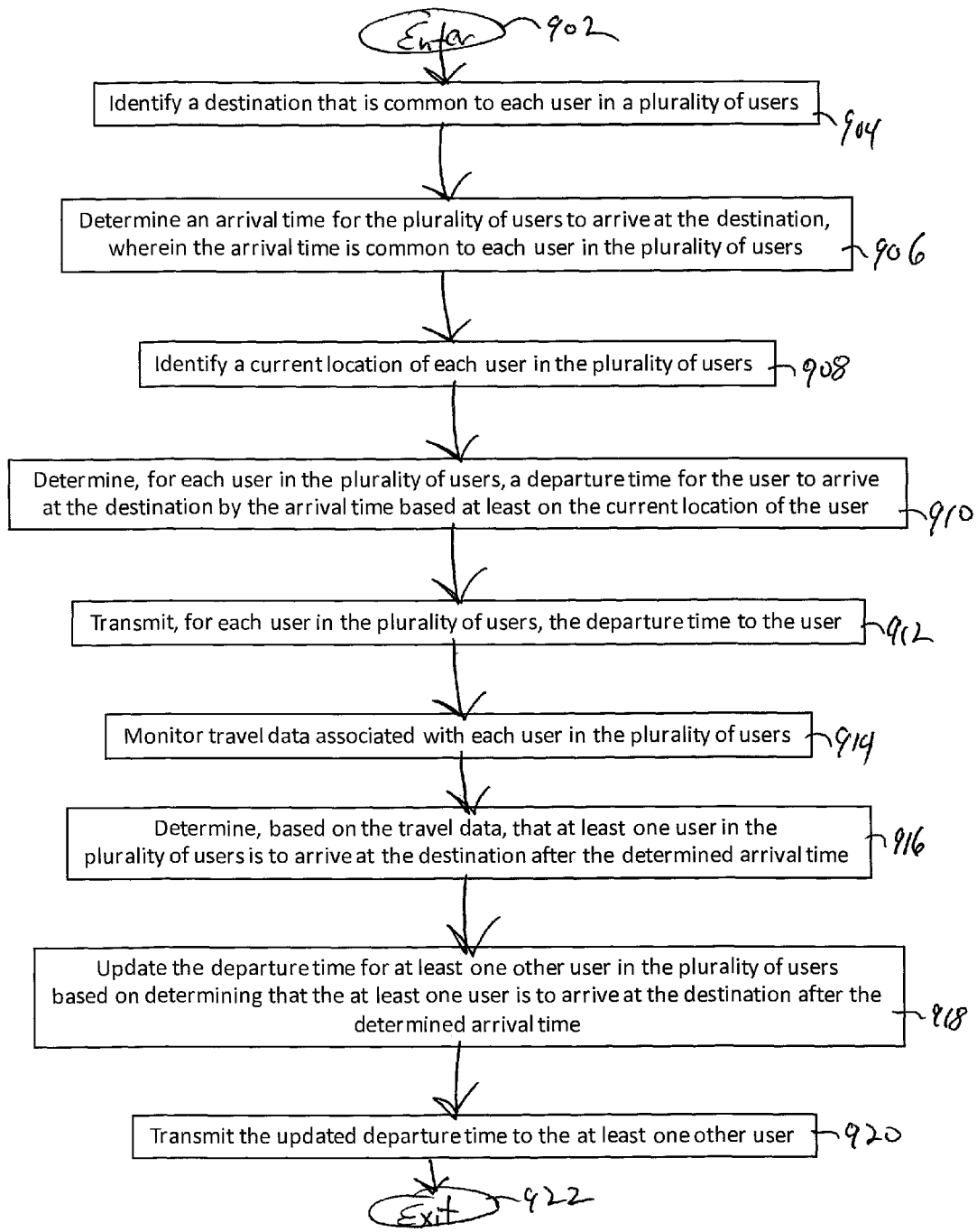
FIG. 9 is an operational flow diagram illustrating one example of coordinating travel among members of a group according to one embodiment of the present disclosure.

FIG. 9 is an operational flow diagram illustrating one example of coordinating travel amongst members of a group. The operational flow begins at 902 and flows directly to 904. The travel manager 136, at step 904, identifies a destination that is common to each user in a plurality of users 102, 104, 106. The travel manager 136, at step 906, determines an arrival time for the plurality of users 102, 104, 106 to arrive at the destination. The arrival time is common to each user in the plurality of users. The travel manager 136, at step 908, identifies a current location of each user in the plurality of users 102, 104, 106.

The travel manager 136, at step 910, determines, for each user in the plurality of users 102, 104, 106, a departure time for the user to arrive at the destination by the arrival time based at least on the current location of the user. The travel manager 136, at step 912, transmits, for each user in the plurality of users 102, 104, 106, the departure time to the user. The travel manager 136, at step 914, monitors travel data associated with each user in the plurality of users 102, 104, 106. The travel manager 136, at step 916, determines, based on the travel data, that at least one user in the plurality of users 102, 104, 106 is to arrive at the destination after the determined arrival time. The travel manager 136, at step 918, updates the departure time for at least one other user in the plurality of users 102, 104, 106 based on determining that the at least one user is to arrive at the destination after the determined arrival time. The travel manager 136, at step 920, transmits the updated departure time to the at least one other user. The travel manager 136 can also calculate an updated arrival time and transmit the updated arrival time to the users as well. The control flow exits at step 922.

User Device

Figure 10:
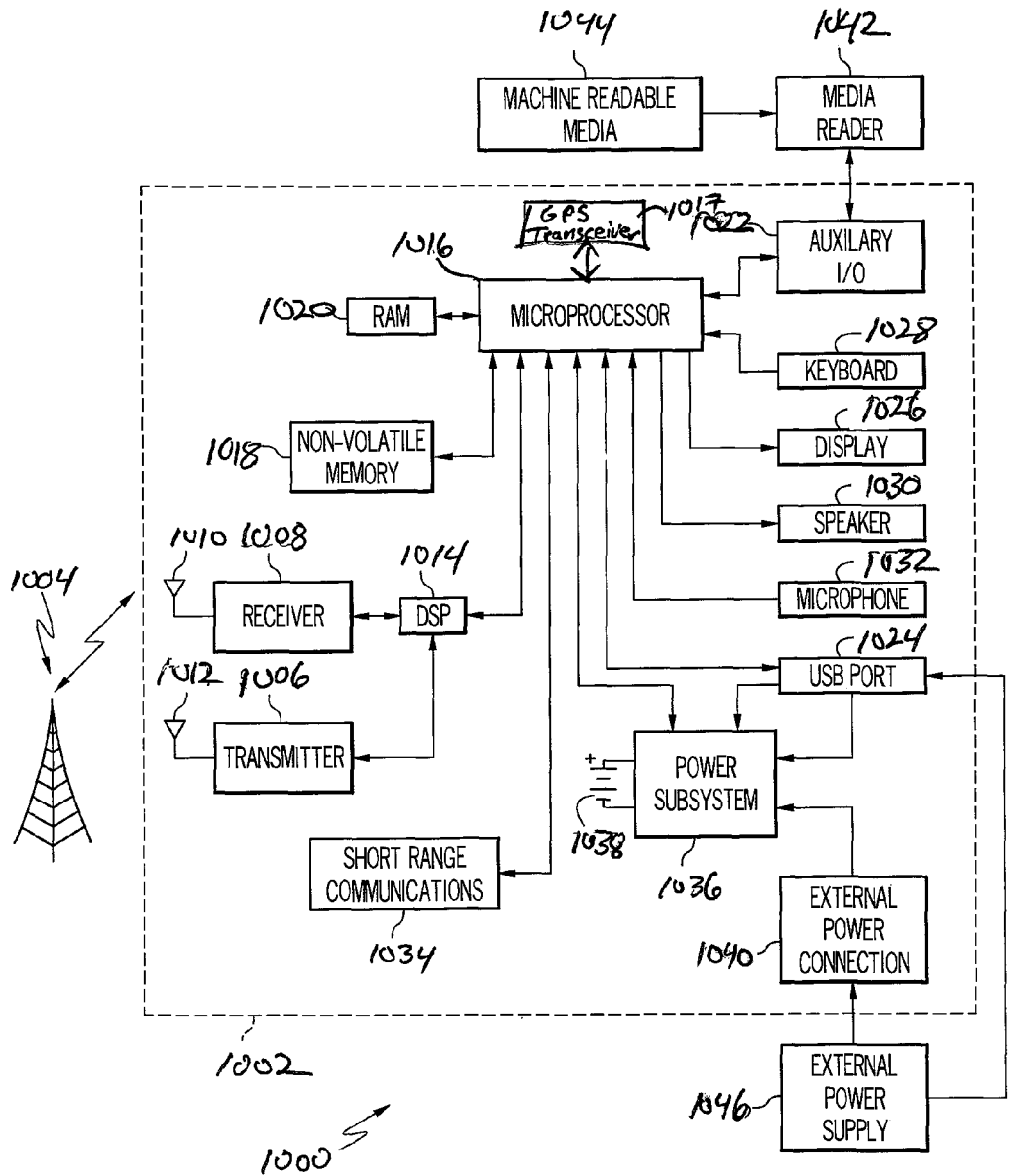
FIG. 10 is a block diagram illustrating one example of a user device according to one embodiment of the present disclosure.

FIG. 10 is a block diagram of an electronic device and associated components 1000 in which the systems and methods disclosed herein may be implemented. In this example, an electronic device 1002 is the user device 102, 104, 106 of FIG. 1 and is a wireless two-way communication device with voice and data communication capabilities. Such electronic devices communicate with a wireless voice or data network 1004 using a suitable wireless communications protocol. Wireless voice communications are performed using either an analog or digital wireless communication channel. Data communications allow the electronic device 1002 to communicate with other computer systems via the Internet. Examples of electronic devices that are able to incorporate the above described systems and methods include, for example, a data messaging device, a two-way pager, a cellular telephone with data messaging capabilities, a wireless Internet appliance, a tablet computing device or a data communication device that may or may not include telephony capabilities.

The illustrated electronic device 1002 is an example electronic device that includes two-way wireless communications functions. Such electronic devices incorporate communication subsystem elements such as a wireless transmitter 1006, a wireless receiver 1008, and associated components such as one or more antenna elements 1010 and 1012. A digital signal processor (DSP) 1014 performs processing to extract data from received wireless signals and to generate signals to be transmitted. The particular design of the communication subsystem is dependent upon the communication network and associated wireless communications protocols with which the device is intended to operate.

The electronic device 1002 includes a microprocessor 1016 that controls the overall operation of the electronic device 1002. The microprocessor 1016 interacts with the above described communications subsystem elements and also interacts with other device subsystems such as non-volatile memory 1018 and random access memory (RAM) 1020. The non-volatile memory 1018 and RAM 1020 in one example contain program memory and data memory, respectively. The microprocessor 1016 also interacts with a global positioning system (GPS) transceiver 1017, an auxiliary input/output (I/O) device 1022, a Universal Serial Bus (USB) and/or other data port(s) 1024, a display 1026, a keyboard 1028, a speaker 1030, a microphone 1032, a short-range communications subsystem 1034, a power subsystem 1036 and any other device subsystems.

A power supply 1038, such as a battery, is connected to a power subsystem 1036 to provide power to the circuits of the electronic device 1002. The power subsystem 1036 includes power distribution circuitry for providing power to the electronic device 1002 and also contains battery charging circuitry to manage recharging the battery power supply 1038. The power subsystem 1036 includes a battery monitoring circuit that is operable to provide a status of one or more battery status indicators, such as remaining capacity, temperature, voltage, electrical current consumption, and the like, to various components of the electronic device 1002. An external power supply 1046 is able to be connected to an external power connection 1040.

The data port 1024 further provides data communication between the electronic device 1002 and one or more external devices. Data communication through data port 1024 enables a user to set preferences through the external device or through a software application and extends the capabilities of the device by enabling information or software exchange through direct connections between the electronic device 1002 and external data source rather than via a wireless data communication network.

Operating system software used by the microprocessor 1016 is stored in non-volatile memory 1018. Further examples are able to use a battery backed-up RAM or other non-volatile storage data elements to store operating systems, other executable programs, or both. The operating system software, device application software, or parts thereof, are able to be temporarily loaded into volatile data storage such as RAM 1020. Data received via wireless communication signals or through wired communications are also able to be stored to RAM 1020. As an example, a computer executable program configured to perform the capture management process 1000, described above, is included in a software module stored in non-volatile memory 1018.

The microprocessor 1016, in addition to its operating system functions, is able to execute software applications on the electronic device 1002. A predetermined set of applications that control basic device operations, including at least data and voice communication applications, can be installed on the electronic device 1002 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. Further applications include applications that have input cells that receive data from a user.

Further applications may also be loaded onto the electronic device 1002 through, for example, the wireless network 1004, an auxiliary I/O device 1022, USB port 1024, short-range communications subsystem 1036, or any combination of these interfaces. Such applications are then able to be installed by a user in the RAM 1020 or a non-volatile store for execution by the microprocessor 1016.

In a data communication mode, a received signal such as a text message or a web page download is processed by the communication subsystem, including wireless receiver 1008 and wireless transmitter 1006, and communicated data is provided the microprocessor 1016, which is able to further process the received data for output to the display 1026, or alternatively, to an auxiliary I/O device 1022 or the data port 1024. A user of the electronic device 1002 may also compose data items, such as e-mail messages, using the keyboard 1028, which is able to include a complete alphanumeric keyboard or a telephone-type keypad, in conjunction with the display 1028 and possibly an auxiliary I/O device 1022. Such composed items are then able to be transmitted over a communication network through the communication subsystem.

For voice communications, overall operation of the electronic device 1002 is substantially similar, except that received signals are generally provided to a speaker 1030 and signals for transmission are generally produced by a microphone 1034. Alternative voice or audio I/O subsystems, such as a voice message recording subsystem, may also be implemented on the electronic device 1002. Although voice or audio signal output is generally accomplished primarily through the speaker 1030, the display 1026 may also be used to provide an indication of the identity of a calling party, the duration of a voice call, or other voice call related information, for example.

A short-range communications subsystem 1036 provides for communication between the electronic device 1002 and different systems or devices, which need not necessarily be similar devices. For example, the short-range communications subsystem 1036 may include an infrared device and associated circuits and components or a Radio Frequency based communication module such as one supporting Bluetooth® communications, to provide for communication with similarly-enabled systems and devices.

A media reader 1042 is able to be connected to an auxiliary I/O device 1022 to allow, for example, loading computer readable program code of a computer program product into the electronic device 1002 for storage into non-volatile memory 1018. In one example, computer readable program code includes instructions for performing the capture management process 1000, described above. One example of a media reader 1042 is an optical drive such as a CD/DVD drive, which may be used to store data to and read data from a computer readable medium or storage product such as computer readable storage media 1044. Examples of suitable computer readable storage media include optical storage media such as a CD or DVD, magnetic media, or any other suitable data storage device. Media reader 1042 is alternatively able to be connected to the electronic device through the data port 1024 or computer readable program code is alternatively able to be provided to the electronic device 1002 through the wireless network 1004.

Information Processing System

Figure 11:
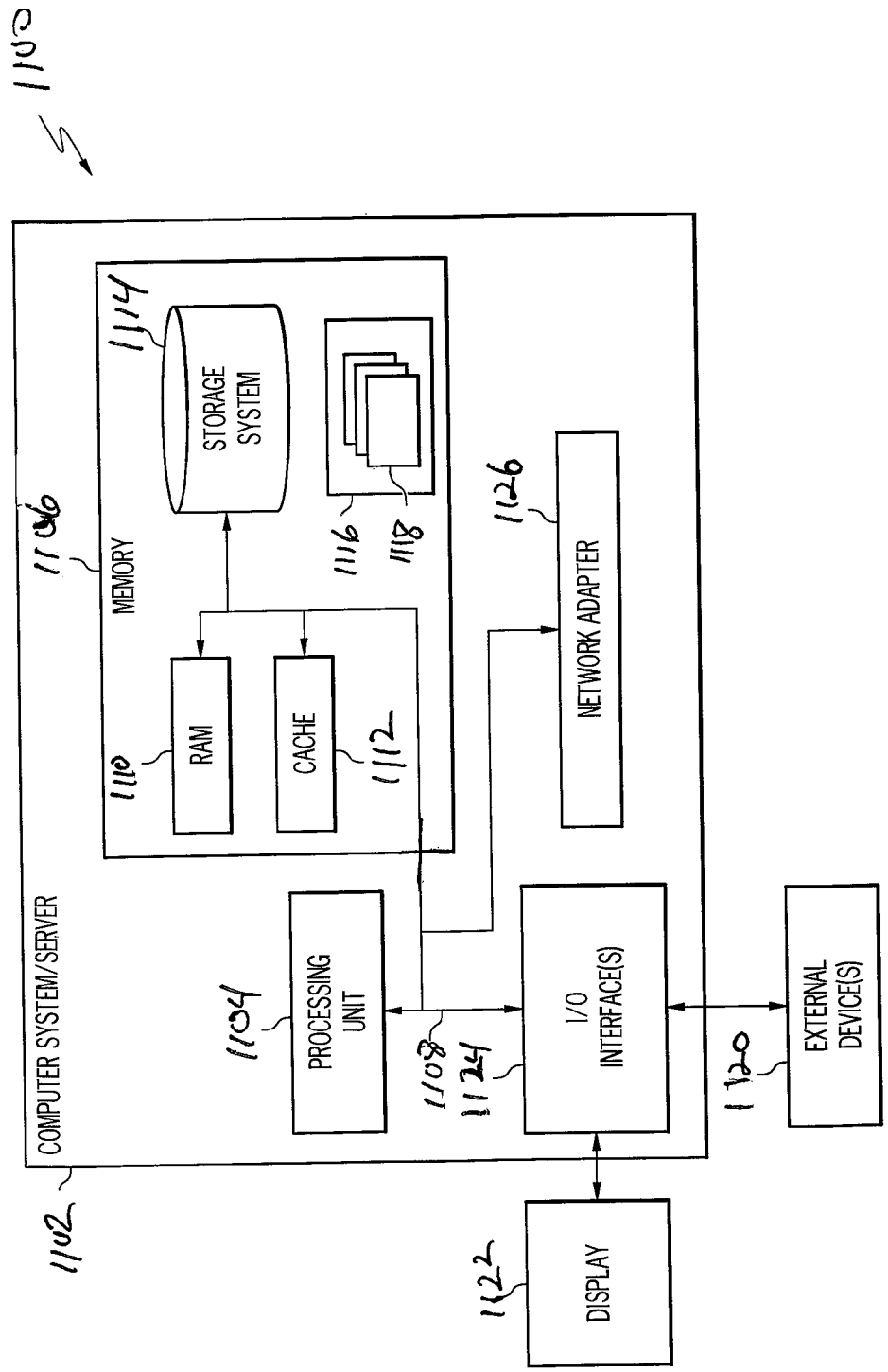
FIG. 11 is a block diagram illustrating one example of an information processing system according to one embodiment of the present disclosure.

Referring now to FIG. 11, this figure is a block diagram illustrating an information processing system that can be utilized in embodiments of the present disclosure. The information processing system 1102 is based upon a suitably configured processing system configured to implement one or more embodiments of the present disclosure.

Any suitably configured processing system can be used as the information processing system 1102 in embodiments of the present disclosure. The components of the information processing system 1102 can include, but are not limited to, one or more processors or processing units 1104, a system memory 1106, and a bus 1108 that couples various system components including the system memory 1106 to the processor 1104. The bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1106 includes computer system readable media in the form of volatile memory, such as random access memory (RAM) 1110 and/or cache memory 1112. The information processing system 1102 can further include other removable/non-removable, volatile/non-volatile computer system storage media. By way of example only, a storage system 1114 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1108 by one or more data media interfaces. The memory 1106 can include at least one program product having a set of program modules that are configured to carry out the functions of an embodiment of the present disclosure.

Program/utility 1116, having a set of program modules 1118, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. Program modules 1118 generally carry out the functions and/or methodologies of embodiments of the present disclosure.

The information processing system 1102 can also communicate with one or more external devices 1120 such as a keyboard, a pointing device, a display 1122, etc.; one or more devices that enable a user to interact with the information processing system 1102; and/or any devices (e.g., network card, modem, etc.) that enable computer system/server 1102 to communicate with one or more other computing devices. Such communication can occur via I/O interfaces 1124. Still yet, the information processing system 1102 can communicate with one or more networks such as a local area network (LAN), a general wide area network (WAN), and/or a public network (e.g., the Internet) via network adapter 1126. As depicted, the network adapter 1126 communicates with the other components of information processing system 1102 via the bus 1108. Other hardware and/or software components can also be used in conjunction with the information processing system 1102. Examples include, but are not limited to: microcode, device drivers, redundant processing units, external disk drive arrays, RAID systems, tape drives, and data archival storage systems.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been discussed above with reference to flowchart illustrations and/or block diagrams of methods, apparatus (systems) and computer program products according to various embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, with a server system device, for coordinating travel among members of a group:
    identifying a destination that is common to each user in a plurality of users;
    determining an arrival time for the plurality of users to arrive at the destination, wherein the arrival time is common to each user of the plurality of users;
    identifying a current location of each user of the plurality of users;
    determining, for each user of the plurality of users, a departure time for the user to arrive at the destination by the arrival time based at least on the current location of the user;
    transmitting, for each user of the plurality of users, the departure time to the user; monitoring travel data associated with each user of the plurality of users;
    after transmitting the departure times to the plurality of users, determining, based on the travel data, that at least one user of the plurality of users is to arrive at the destination after the determined arrival time;
    updating the departure time for at least one other user of the plurality of users based on determining that the at least one user is to arrive at the destination after the determined arrival time; and
    transmitting the updated departure time to the at least one other user.

2. The method of claim 1, further comprising:
    determining, for at least one user of the plurality of users, that a current time corresponds to the departure time determined for the at least one user; and
    notifying the at least one user to begin travelling to the destination.

3. The method of claim 1, wherein determining the departure time comprises:
    identifying at least one route between the current location of the user and the destination;
    calculating an amount of time to travel the route; and
    calculating the departure time based on the arrival time and the calculated amount of time.

4. The method of claim 3, wherein identifying at least one route comprises:
    receiving, from a user device associated with the user, a selection of the route.

5. The method of claim 3, wherein calculating an amount of time to travel the distance is further determined as a function of at least one of weather data and traffic data associated with the at least one route.

6. The method of claim 1, wherein determining that the at least one user of is to arrive at the destination after the determined arrival time is based on monitoring travel data associated with each user of the plurality of users.

7. The method of claim 1, further comprising:
monitoring travel data associated with each user of the plurality of users;
determining, based on the travel data, that at least one user of the plurality of users is to arrive at the destination after the determined arrival time;
updating the arrival time for each user of the plurality of users to arrive at the destination based on determining that the at least one user is to arrive at the destination after the determined arrival time; and
transmitting the updated arrival time to the at least one other user.

8. A non-transitory computer program product for coordinating travel among members of a group, the non-transitory computer program product comprising a computer readable storage medium having computer readable program code embodied therewith, the computer readable program code configured to perform:
identifying a destination that is common to each user in a plurality of users;
determining an arrival time for the plurality of users to arrive at the destination, wherein the arrival time is common to each user of the plurality of users;
identifying a current location of each user of the plurality of users;
determining, for each user of the plurality of users, a departure time for the user to arrive at the destination by the arrival time based at least on the current location of the user;
transmitting, for each user of the plurality of users, the departure time to the user;
after transmitting the departure times to the plurality of users, determining, based on the travel data, that at least one user of the plurality of users currently in route to the destination is to arrive at the destination after the determined arrival time;
updating the departure time for at least one other user of the plurality of users based on determining that the at least one user is to arrive at the destination after the determined arrival time; and
transmitting the updated departure time to the at least one other user.

9. The non-transitory computer program product of claim 8, wherein the computer readable program code is further to perform:
determining, for at least one user in the plurality of users, that a current time corresponds to the departure time determined for the at least one user; and
notifying the at least one user to begin travelling to the destination.

10. The non-transitory computer program product of claim 8, wherein determining the departure time comprises:
identifying at least one route between the current location of the user and the destination;
calculating an amount of time to travel the route; and
calculating the departure time based on the arrival time and the calculated amount of time.

11. The non-transitory computer program product of claim 10, wherein identifying at least one route comprises:
receiving, from a user device associated with the user, a selection of the route.

12. The non-transitory computer program product of claim 10, wherein calculating an amount of time to travel the distance is further determined as a function of at least one of weather data and traffic data associated with the at least one route.

13. The non-transitory computer program product of claim 8, wherein the computer readable program code is further to perform:
monitoring travel data associated with each user of the plurality of users;
determining, based on the travel data, that at least one user of the plurality of users is to arrive at the destination after the determined arrival time;
updating the departure time for at least one other user of the plurality of users based on determining that the at least one user is to arrive at the destination after the determined arrival time; and
transmitting the updated departure time to the at least one other user.

14. The non-transitory computer program product of claim 8, wherein the computer readable program code is further to perform:
monitoring travel data associated with each user of the plurality of users;
determining, based on the travel data, that at least one user of the plurality of users is to arrive at the destination after the determined arrival time;
updating the arrival time for each user of the plurality of users to arrive at the destination based on determining that the at least one user is to arrive at the destination after the determined arrival time; and
transmitting the updated arrival time to the at least one other user.

15. An information processing system for coordinating travel among members of a group, the system comprising:
memory;
at least one processor communicatively coupled to the memory; and
a travel coordinator communicatively coupled to the memory and the at least one processor, wherein the travel coordinator is configured to perform
determining a destination that is common to each user in a plurality of users;
determining, based on a current location of each user in the plurality of users, a user furthest from the destination;
determining a plurality of routes and associated travel times from the current location of the user to the destination;
determining an arrival time for the plurality of users to arrive at the destination based on an average of the travel times associated with at least two routes of the plurality of routes determined for the user, wherein the arrival time is common to each user in the plurality of users;
determining, for each user in the plurality of users, a departure time for the user to arrive at the destination by the arrival time based at least on the current location of the user; and
transmitting, for each user of the plurality of users, the departure time to the user.

16. The information processing system of claim 15, wherein the computer readable program code is further to perform:
determining, for at least one user of the plurality of users, that a current time corresponds to the departure time determined for the at least one user; and
notifying the at least one user to begin travelling to the destination.

17. The information processing system of claim 15, wherein determining the departure time comprises:

identifying at least one route between the current location of the user and the destination;

calculating an amount of time to travel the route; and calculating the departure time based on the arrival time and the calculated amount of time.

18. The information processing system of claim 17, wherein calculating an amount of time to travel the distance is further determined as a function of at least one of weather data and traffic data associated with the at least one route.

19. The information processing system of claim 15, wherein the travel coordinator is further to perform:

monitoring travel data associated with each user of the plurality of users;

determining, based on the travel data, that at least one user of the plurality of users currently in route to the destination is to arrive at the destination after the determined arrival time;

updating the departure time for at least one other user of the plurality of users based on determining that the at least one user is to arrive at the destination after the determined arrival time; and transmitting the updated departure time to the at least one other user.

20. The information processing system of claim 15, wherein the travel coordinator is further to perform:

monitoring travel data associated with each user of the plurality of users;

determining, based on the travel data, that at least one user of the plurality of users is to arrive at the destination after the determined arrival time;

updating the arrival time for each user of the plurality of users to arrive at the destination based on determining that the at least one user is to arrive at the destination after the determined arrival time; and transmitting the updated arrival time to the at least one other user.

* * * * *